Aug. 20, 1946.  S. C. GEBERT  2,406,142
OVERLOAD RELEASE COUPLING
Filed Oct. 28, 1944

INVENTOR.
SEVER C. GEBERT
BY
ATTORNEY

Patented Aug. 20, 1946

2,406,142

UNITED STATES PATENT OFFICE 2,406,142

OVERLOAD RELEASE COUPLING

Sever C. Gebert, Chicago, Ill., assignor to Fairbanks, Morse & Co., Chicago, Ill., a corporation of Illinois Application October 28, 1944, Serial No. 560,878

4 Claims. (Cl. 192—56)

This invention relates generally to coupling or clutch mechanism of automatic overload release type, for operatively interconnecting driving and driven members, and has particular reference to an improved device of this character, suitable for use with material handling apparatus such as fuel delivery conveyors employed in domestic stokers and the like.

An object of the invention resides in the provision of a simple yet highly effective coupling or clutch for driving and driven members, serving to maintain operative connection of the members throughout normal operation under loads not exceeding a preselected maximum, but operative automatically, to release the connection immediately as the load on the clutch tends to exceed or exceeds only slightly, the selected maximum.

Another object of the invention is to provide a device for the purpose indicated, of an improved spring-toggle character, wherein the proportioning and relative arrangement of the spring and toggle elements are such as to render the device extremely sensitive in its releasing function, to loading only slightly above the maximum load as determined by spring capacity and adjustment of spring pressure, under which the device will maintain an operative connection of the driving and driven members, and to result responsively to such slight overloading, in an immediate collapse of the toggle to break the connection between the driving and driven members, and further, wherein by reason of the presently improved relationship of the clutch elements, the resistance to collapse offered by the spring-toggle assembly following only slight initial movement of the toggle in the collapsing direction, decreases materially during collapse, so that a very rapid or immediate and positive collapse of the toggle clutch is thus assured.

A further object is to provide a toggle clutch of the character and for the purpose indicated, which is comprised of relatively few parts adapted for ready assembly or disassembly, and which following automatic release or collapse, may be easily manually reset to its normal position establishing operative connection of the driving and driven member.

Still further objects and advantages of the invention will appear from the following description of a preferred embodiment thereof as illustrated by the accompanying drawing, wherein.

Figure 1:
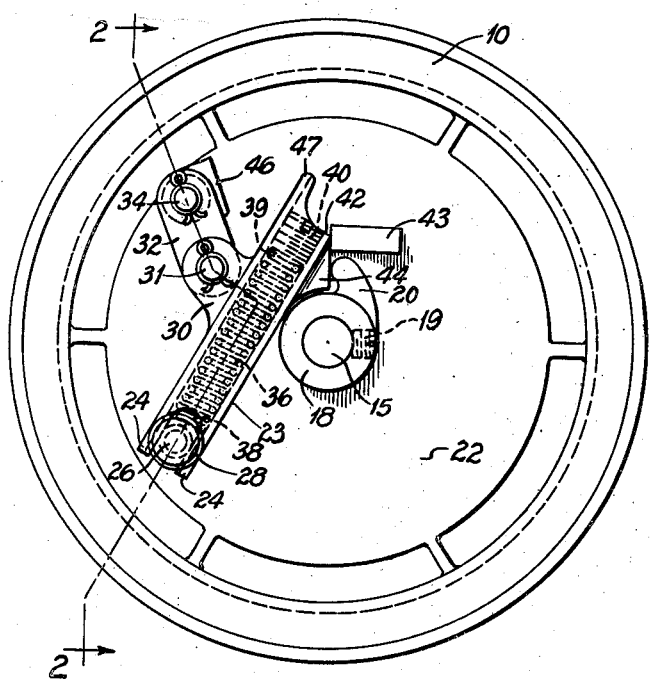
Fig. 1 is a view in assembly elevation, of the presently improved toggle clutch, shown in an operative position relative to driving and driven members.
Figure 2:
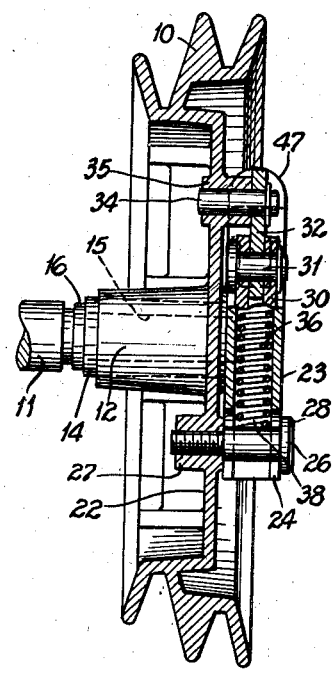
Fig. 2 is a sectional view through the driving member and toggle assembly, as taken along line 2—2 in Fig. 1.

Referring now to the drawing by appropriate characters of reference, for illustrative purposes the improved coupling or clutch mechanism is shown as applied to a pulley or sheave 10 and a shaft 11 on which the sheave 10 is freely rotatably journalled. The latter elements in the present case, may represent parts of a stoker fuel conveyor assembly, wherein the sheave is the driving member, belt-driven for example, from the motor assembly (not shown), and the shaft is the driven member, for example, connected to or forming the shaft part of a reduction gear unit (not shown) operatively associated with a helical or other type conveyor structure (not shown), serving to conduct fuel from a suitable source to the stoker burner or retort (not shown). In normal operation, the clutch serves to maintain an operative connection of the sheave and shaft elements in a manner hereinafter to appear, but in the event of abnormal loading of the shaft 11, such as may be imposed by jamming or stoppage of the fuel conveyor, the clutch automatically disengages the shaft and sheave, so that the latter may continue to rotate without damage to the stoker motor assembly or other operating parts of the apparatus.

As shown, the sheave 10 has its hub 12 freely journalled through a sleeve bearing 14, on the end 15 of shaft 11, the sheave being retained and limited in longitudinal displacement thereon by abutment of the bearing 14 with a shaft flange 16, and by a collar member 18 at the outer end of the shaft portion 15, and suitably secured to the shaft as by a set screw 19. The collar 18 is adapted through a laterally extending peripheral projection or nose 20, to form one clutch element of the presently improved clutch device. The remaining elements of the clutch are carried entirely on the sheave 10, as will appear from the description hereinafter.

Arranged to overlie the outer face of the sheave web 22, is a tubular or barrel member 23 serving as a clutch pawl, and having one end bifurcated to provide arm portions 24 for embracing a pin element 26 carried in a bossed portion 27 formed in the web 22 inwardly of the sheave periphery. The barrel is thus supported in part, by the pin 26 so as to be capable of both pivotal and transverse or bodily displacement relative thereto, the pin being provided with a flange head 28 as shown, to confine the barrel arms 24 between it and the boss 27. At a predetermined zone intermediate the ends of the barrel and on one side thereof, is a projection or arm element 30, the element by preference, being formed integrally with the adjacent barrel wall. Pivoted to the element 30 as by a suitable pivot pin 31, is one end of a link member 32, the link being pivotally or swingably supported at its opposite end, by a pin 34 secured in a boss 35 formed in the sheave web 22 inwardly of the sheave periphery. The relative arrangement of the parts as thus far described, is such as to establish a toggle structure, the arms of which are constituted by the link 32 and barrel or pawl element 23, and wherein the pivotal connection between the link and barrel as represented by the pin 31, is displaceable transversely between the pivot supports 26 and 34, in an arc having its center coincident with the axis of pin 34. Loading or tensioning of the toggle is accomplished by a coil spring 36 of predetermined capacity, housed lonigtudinally in the barrel 23, with one end 38 abutting the pin 26 and its opposite end 39 in abutment with a plug element 40 threadedly received in the inner or free end 42 of the barrel. The spring thus under compression within the barrel, tends to move the barrel longitudinally off of its pivotal supporting pin 26, but is prevented from doing so in the operative or clutching position of the toggle, by abutment of the barrel end 42 with a stop element 43 outstanding on the sheave web 22 (Fig. 1). In such position the barrel is located for driving engagement with the shaft collar 18, or more particularly the collar nose 20, through a cooperating projection or nose 44 integral with the end 42 of the barrel.

In its driving position, the maximum load under which the clutch will maintain the driving connection of the sheave 10 and shaft 11, is determined by the effective arrangement of the toggle, the capacity of the toggle loading spring 36 selected for the device, and the degree of compression imposed on the spring in clutch assembly. As so determined, the maximum load capacity of the clutch may be varied within compressibility limits of the particular spring 36, by altering the degree of spring compression within the barrel 23, through threaded adjustment of the plug 40 longitudinally of the barrel.

Figure 3:
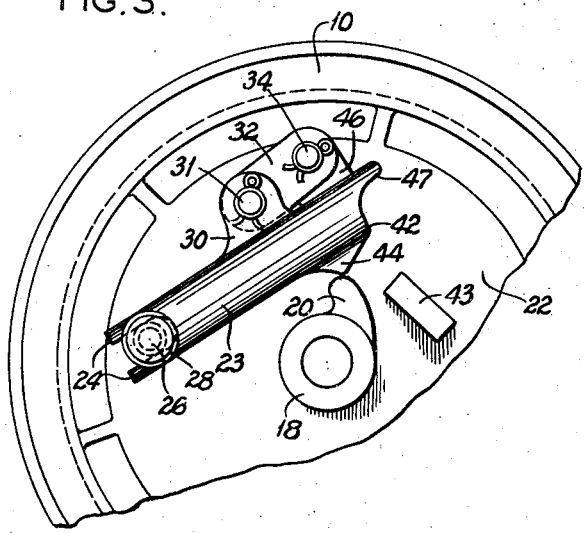
Fig. 3 is a fragmentary assembly view similar to that of Fig. 1, but illustrating the toggle clutch in collapsed position.

The position of toggle collapse is shown in Fig. 3, and is determined preferably, by abutment of the free end 42 of barrel 23 with a flange or boss 46 on the adjacent margin of the link 32, thus disposing the barrel so that the axis of toggle pivot 31 lies slightly to the left of the plane through the axes of the pivots 26 and 34, whereby the spring 36 then under considerable compression, will maintain the collapsed condition of the toggle. Restoration of the toggle to its drive position upon correction of the condition or conditions producing toggle collapse, is here manually effected, as facilitated by a finger piece 47 projecting longitudinally beyond the barrel end 42. The manual force required to do this is only that necessary to carry the toggle over center such that the pivot 31 lies to the right of the plane through the axes of pivots 26 and 34, whereupon the toggle will snap into place under the bias of spring 36, to engage the barrel end 42 with the stop 43, and thus to position the barrel nose 44 for driving contact with the nose 20 of collar 18 on shaft 11.

According to present improvements, the clutch device is adapted for releasing the drive connection between the sheave 10 and shaft 11, automatically upon overloading of the driven means as represented by the shaft 11. In a stoker installation for example, where shaft 11 is related as through a reduction gear unit, with the fuel feeding conveyor, the conveyor sometimes is subjected to abnormal strains or may become jammed usually because of extraneous, non-frangible material in the coal being conveyed. Thus in order to prevent damage to the conveyor and its driving mechanism, provision must be made to release the conveyor under abnormal operating conditions, and this the presently improved clutch does fully and quickly, in a manner now to be described.

Figure 4:
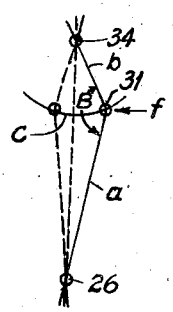
Fig. 4 is a diagrammatic illustration of the effective toggle arm relationship afforded by the toggle assembly.

The toggle arrangement of the clutch is illustrated diagrammatically in Fig. 4, wherein 26, 31 and 34 are the pivot points heretofore described; the line $a$ the effective toggle arm of the barrel or pawl 23; the line $b$ the effective arm of the link 32, being the longitudinal axis of the latter, and $c$ the arc on which the pivot 31 moves. The solid line positions of the effective arms $a$ and $b$ represent the condition of clutch engagement in connecting the drive sheave 10 and the shaft 11, as through abutment of the barrel nose 44 and the nose 20 on shaft collar 18 (Fig. 1). Under normal operating conditions, the toggle clutch will maintain the drive connection through loads up to a predetermined maximum here represented by the force component $f$ reflected on the toggle-arm pivotal connection 31, the maximum load transmittable being determined by the capacity and compression adjustment of the toggle spring 36, and by the particular angular relation of the effective toggle arms $a$ and $b$ when the clutch is in operative position. The latter in the present preferred example, being the angle B, is determined to be approximately or of the order of 147 degrees (Fig. 4), and is effected in order to attain a quick or snap collapse of the clutch on overloads, under a diminishing resistance to collapse once collapse is initiated. Thus by reason of the given angular relation of the effective toggle arms in the operative or clutching position of the structure, and since the effective force of compression spring 36 in application to the toggle-arm pivot 31, is at all times coaxial of the effective toggle arm $a$, the clutch is rendered quite sensitive to even very slight loading above the maximum load $f$ under which the device will maintain the drive connection, and offers diminishing resistance to collapse as collapse takes place. In other words, the toggle and spring arrangement is such that upon initiation of collapsing displacement of the toggle arms, permitted by the longitudinal sliding movement of barrel 23 relative to the pivot 26, wherein the spring 36 is further compressed, the resistance to collapse imposed by the toggle-spring arrangement actually decreases in value, from the force initiating collapse, and is decreasingly less than the maximum force $f$ which the toggle will successfully oppose. Hence, there is afforded by the present improvements, an overload-sensitive toggle clutch which will release the drive connection automatically in response to overloading imposed thereon through shaft 11, with release occurring immediately, by snap-collapse of the toggle, as the load tends to exceed or exceeds only slightly the maximum under which the device will maintain the drive connection.

The invention now having been fully described in connection with the presently preferred embodiment thereof, as illustrated by the drawing, it will be readily appreciated that the toggle-clutch or connector device for driving and driven members, is not limited to stoker mechanisms as herein given by way of an example of its utility, but may be employed in mechanisms or apparatus generally, wherein a clutch sensitive to overloads and automatically releasable in response thereto, is required or desirable, as to prevent damage to moving parts of the equipment. Although shown and described in respect to its preferred form, the clutch may be altered or modified as to its parts and the operative arrangement thereof, without departing from the spirit and intended scope of the invention as hereinafter claimed.

I claim:

1. An overload-sensitive clutch of the character described, comprising in combination with driving and driven members, a clutch element on said driven member, a toggle structure on said driving member and including a tubular element, a clutch pawl carried by and extending laterally of said tubular element, means coacting with one end of said tubular element to support the tubular element for both pivotal and bodily movements relative to the driving member, a link swingably carried by the driving member and pivotally connected to said tubular element intermediate the ends of the latter, a closure for the opposite end of said tubular element, and a toggle loading spring arranged longitudinally in said tubular element between said means and said closure, said toggle structure affording displacement of said tubular element between a position of engagement of said pawl with said clutch element and a position of toggle collapse wherein the pawl is removed from said engagement, and said spring effectively loading said toggle in the position of the tubular element wherein the pawl is in engagement with said clutch element, so as yieldably to retain the tubular element in such position to a predetermined load limit.

2. An overload-sensitive clutch of the character described, comprising in combination with driving and driven members, a clutch element on the driven member, and a toggle structure on the driving member, including a clutch pawl, a pin carried by the driving member and coacting with one end of said pawl to support the latter for displacement movements relative to the member, a link pivotally connected to said pawl, means pivotally supporting the link on the driving member, means on said link providing an abutment, a spring-support on the pawl, and a spring arranged between said pin and spring-support, the toggle structure as so constituted, affording pawl displacement between a position of engagement with said clutch element and a position of toggle collapse determined by contact of said pawl with said abutment, wherein the pawl is removed from clutch engagement, said spring being effective yieldably to maintain the pawl in engagement with the clutch element to a predetermined load limit, and said pawl and link in the toggle structure, defining effective toggle arms which in said position of the pawl in engagement with the clutch element, are relatively angularly related by an obtuse angle of the order of 147 degrees.

3. An overload-sensitive clutch of the character described, comprising in combination with driving and driven members, a clutch element on the driven member, a tubular member providing a clutch pawl projecting laterally therefrom near one end of the member and adapted for engagement with said clutch element, the opposite end of said tubular member being longitudinally bifurcated to present substantially parallel arms defining a slot therebetween, a pin outstanding on the driving member, said tubular member being arranged relative to the pin such that the pin is received in said slot with said arms embracing opposite sides of the pin, the tubular member thereby being mounted for both pivotal and bodily movements relative to the pin, said tubular member further having a lateral boss thereon in a position intermediate the ends of the member, a link pivotally carried on the driving member, means pivotally connecting the link to said boss of the tubular member, a closure for said one end of the tubular member, adjustable longitudinally of the latter, and a spring within the tubular member between said closure and said pin, effective yieldably to maintain said tubular member in a position of engagement of its pawl with said clutch element to a predetermined load limit.

4. An overload-sensitive clutch of the character described, comprising in combination with driving and driven members, a clutch element on the driven member, a tubular member providing a clutch pawl projecting laterally therefrom near one end of the member and adapted for engagement with said clutch element, the opposite end of said tubular member being longitudinally bifurcated to present substantially parallel arms defining a slot therebetween, a pin outstanding on the driving member, said tubular member being arranged such that said pin is received in said slot with said arms embracing opposite sides of the pin, thereby mounting the member for both pivotal and bodily movements relative to the pin, said tubular member further having a lateral boss thereon located intermediate the ends of the member, a link pivotally carried on the driving member and providing an abutment along one side thereof, means pivotally connecting the link to said boss of the tubular member, an adjustable closure for said one end of the tubular member, and a spring within the tubular member between said closure and said pin, said tubular member and said link as so connected and mounted upon the driving member, forming a toggle structure wherein said spring is effective yieldably to maintain the tubular member of the toggle in a position of engagement of its pawl with said clutch element to a predetermined load limit, said toggle structure responding immediately to initial slight overload, by collapse thereof to a position determined by engagement of the tubular member with said abutment on the link, wherein said pawl is removed from engagement with the clutch element.

S. C. GEBERT.